INVENTOR.
Sanjiro Murata
BY [illegible]
Attorneys

Dec. 23, 1969 SANJIRO MURATA 3,485,963

ULTRAMINIATURE TAPE RECORDER WITH TWO-WAY GRAVITY-OPERATED CONTROL SWITCH ACTUATED BY CHANGE IN VERTICAL ORIENTATION OF RECORDER

Filed Feb. 16, 1968 4 Sheets-Sheet 3

ULTRAMINIATURE TAPE RECORDER WITH TWO-WAY GRAVITY-OPERATED CONTROL SWITCH ACTUATED BY CHANGE IN VERTICAL ORIENTATION OF RECORDER

Filed Feb. 16, 1968

3,485,963
Patented Dec. 23, 1969

3,485,963

ULTRAMINIATURE TAPE RECORDER WITH TWO-WAY GRAVITY-OPERATED CONTROL SWITCH ACTUATED BY CHANGE IN VERTICAL ORIENTATION OF RECORDER

Sanjiro Murata, 10-60 3-chome, Kamiosaki, Shinagawa-ku, Tokyo-to, Japan

Filed Feb. 16, 1968, Ser. No. 706,150
Claims priority, application Japan, Feb. 20, 1967, 42/10,741
Int. Cl. G11b *5/00*
U.S. Cl. 179—100.2 4 Claims

ABSTRACT OF THE DISCLOSURE

A gravity-operated device causes an ON-OFF control mechanism to switch on either a recording circuit or a reproducing circuit in a miniature tape recorder depending on which of a recording side and an opposite reproducing side of the recorder is faced upward, the ON-OFF control mechanism being operated by a single button, and rewinding is controlled by another single button clearly distinguishable from the ON-OFF button, whereby there is little possibility of erroneous control manipulation even in the dark. The recording side accommodates a recording tape and the reproducing side contains a loudspeaker facing outward, whereby the entire tape recorder is miniaturized into a compact pocket size.

BACKGROUND OF THE INVENTION

This invention relates generally to the field of tape recorders and more particularly to a new and improved ultaminiaturized tape recorder having highly advantageous features as will persently become apparent.

Almost all tape recorders known heretofore have been of the type wherein a tape is loaded on an upper panel of the recorder main structure or case, and both sound recording and reproducing are carried out with the recorder in the same orientational state. Accordingly, in order to carry out the separate operations of recording and reproducing, it is necessary to select correctly from among a plurality of switch buttons those for recording and those for reproducing, for example, two switch buttons for recording and one button for reproducing.

For this reason, there are frequent instances in actual practice of incorrect control manipulation due to erroneous selection of the switch buttons. For example, when reproduction is intended, the recording buttons may be erroneously pressed to cause erasure of the recorded sound, or, when recording is intended, the reproduction button may be erroneously pressed to cause reproduction, whereby recording is not accomplished. Thus, a tape recorder of this known type has the disadvantage feature of not being easily operable by children and other unskilled or inexperienced persons and not being operable in the dark. Another disadvantage of this known type is that the entire recorder structure cannot be miniaturized to true "pocket size" without sacrificing performance and is therefore inconvenient for carrying.

SUMMARY OF THE INVENTION

It is a first object of the present invention to provide a tape recorder wherein the recording-reproducing control is simplified and requires no selection from a plurality of switches, whereby the tape recorder can be operated without error for recording and reproducing even by unskilled persons and even in the dark.

A second object of the invention is to provide a low-priced tape recorder in which the recording-reproducing control mechanism is simplified, whereby the possibility of malfunctioning or failure is reduced.

The foregoing first and second objects have been achieved by the present invention in accordance with which recording is carried out one side of the recorder structure, and reproducing is carried out on the opposite side by bodily inverting the recorder, the changeover switching of the circuits for recording and reproducing being automatically accomplished by the turning over of the recorder through 180 degrees of angle about a horizontal axis and thereby requiring no selection of control switches.

A third object of the invention is to provide a tape recorder of the above stated character which is of ultra-miniature pocket size yet has a tone quality comparable to that of conventional tape recorders. This object has been achieved by mounting a loudspeaker of the same size as loudspeakers used heretofore in conventional tape records in a position to face the reverse side or planar side of the recorder structure opposite the side into which the tape is loaded.

According to the present invention, briefly summarized, there is provided an ultra-miniature tape recorder characterized by opposite first and second panel sides, the first panel side accommodating a recording tape and being turned upward for recording, the second panel side having an outwardly facing loudspeaker and being turned upward for reproducing, activating means operable by a single ON-OFF button to turn on and off a power supply to a tape driving mechanism and recording and reproducing circuits, and gravity-operated means actuated by the activating means and gravity to switch on and off the recording and reproducing circuits, respectively, when the first panel side is facing upward and to switch off and on these circuits, respectively, when the second panel side is facing upward.

BRIEF DESCRIPTION OF THE DRAWINGS

The nature, principle, details, and utility of the invention will be more clearly apparent from the following detailed description with respect to a preferred embodiment of the invention when read in conjunction with the accompanying drawings, in which like parts are designated by like reference numerals.

In the drawings.

Figure 1:
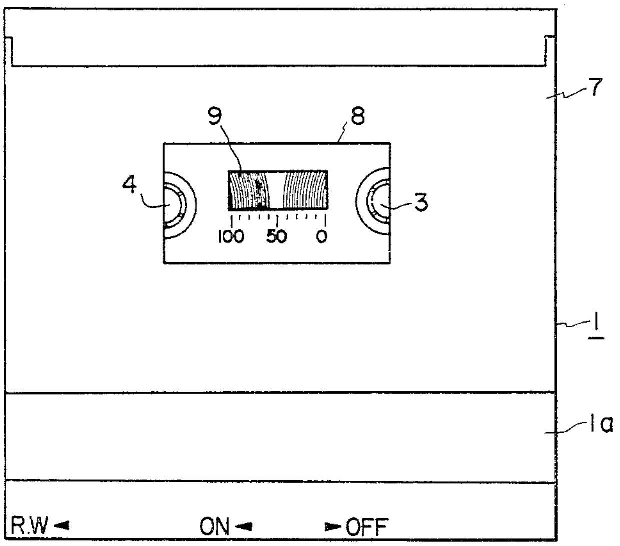
FIG. 1 is a top plan view showing the exterior of the top or tape side of an example of tape recorder embodying the invention, the top cover of the recorder case being closed.
Figure 2:
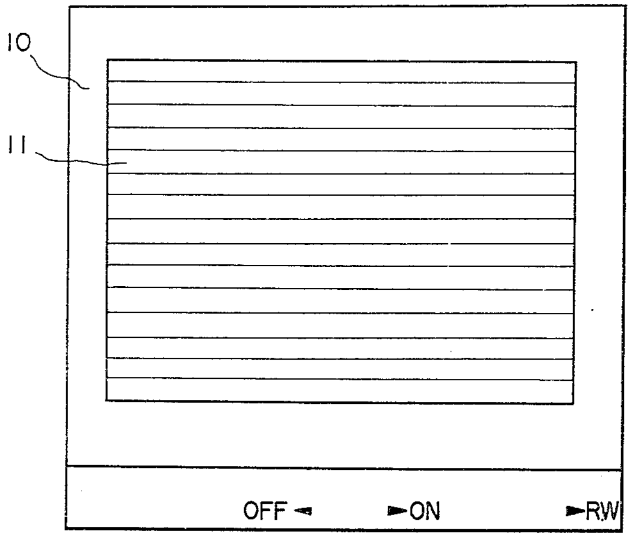
FIG. 2 is a bottom plan view showing the exterior of the bottom or loudspeaker side of the recorder showing in FIG. 1.
Figure 3:
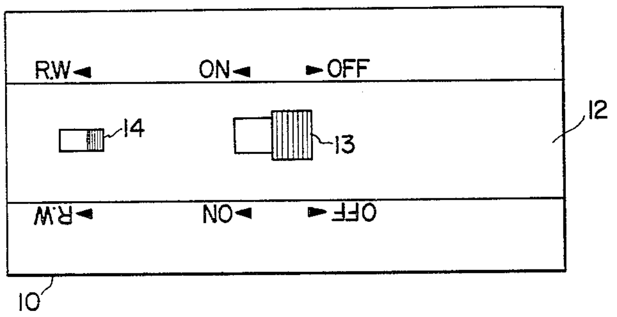
FIG. 3 is a front elevational view showing the exterior of a side, herein called the front side, on which two switch buttons are mounted.
Figure 4:
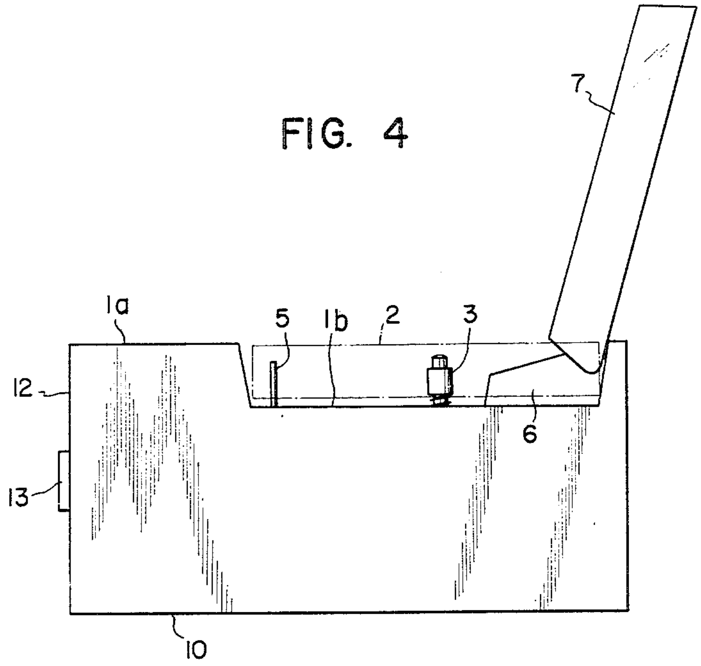
FIG. 4 is a side elevational view showing the exterior of the right side of the tape recorder with the top cover opened.
Figure 5:
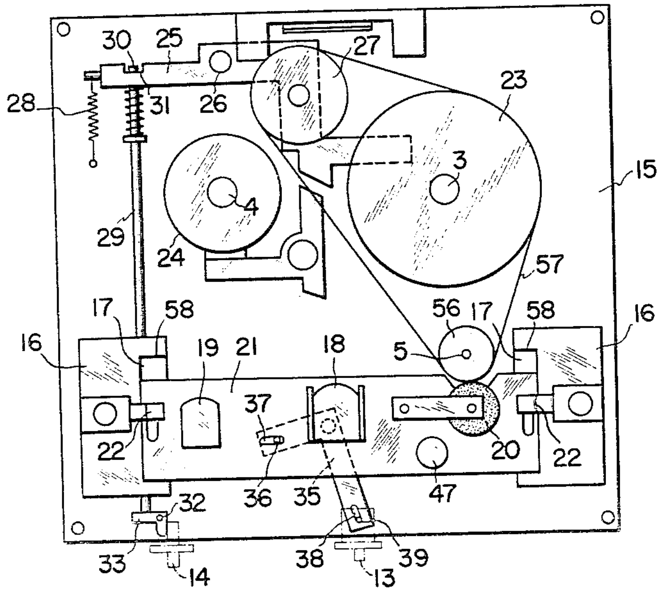
FIG. 5 is a top plan view showing the essential internal organization of the tape recorder on the top side without the outer case.
Figure 6:
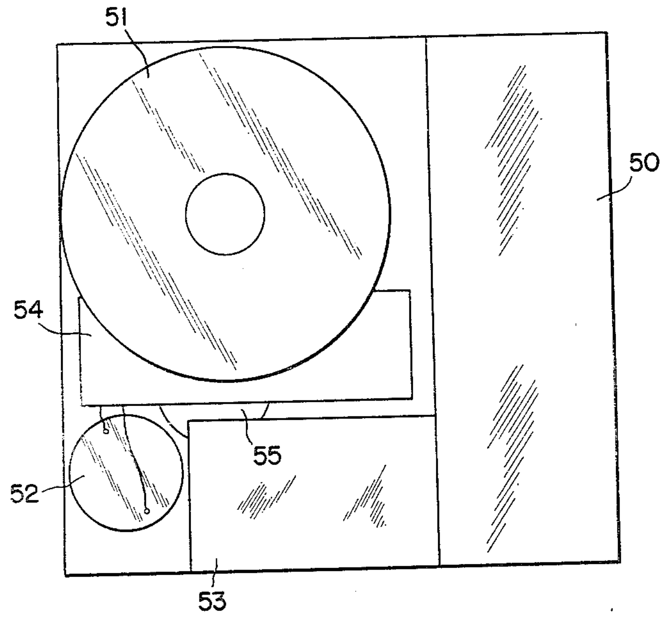
FIG. 6 is a bottom plan view showing the essential internal organization of the tape recorder on the bottom side without the outer case.
Figure 7:
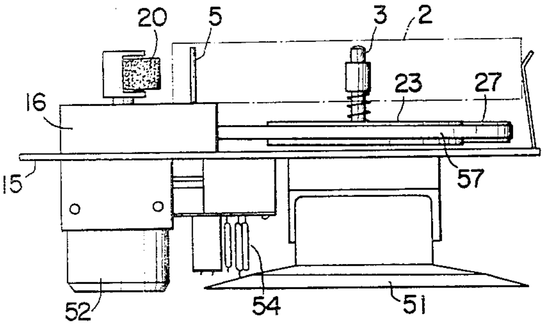
FIG. 7 is a side elevational view showing the internal parts of the tape recorder as viewed from the right in FIG. 5.

For the sake of consistency in describing spacial directions and sides, the upper and lower sides of the tape recorder as viewed in FIGS. 3, 4, 7, and 8 are herein called the "top" and "bottom" sides, respectively; the left and right sides as viewed in FIGS. 1, 3, and 5 are called "left" and "right" sides, respectively; and the left and right sides as viewed in FIG. 4 are called the "front" and "rear" sides, respectively.

DETAILED DESCRIPTION OF THE INVENTION

In the preferred embodiment of the invention as illustrated in the drawings, the mechanical and electrical operational parts are enclosed within an outer case 1 and mounted on a base plate 15 which is fixed to the case 1 and divides the interior of the case 1 into a top (or tape) compartment and a bottom (or loudspeaker) compartment.

A stepped top panel 1*a*, 1*b*, constituting the top side of the case 1, has a depressed lower-level panel 1*b* for accommodating a tape cartridge 2 and is coverable by a swinging top cover 7. The panel 1*b* has holes through which a winding (take-up) spindle 3, a rewinding spindle 4, and a tape drive spindle (or capstan) 5 pass vertically outward at positions to fit into corresponding spindle receiving holes of the tape cartridge 2 mounted in loaded position. Side walls 6 are provided at the left and right sides of the panel 1*b* and function as brackets on which the top cover 7 is pivoted. The top cover 7 has a window 8 at its central part, through which window the tape 9 can be observed.

The bottom wall 10 of the case 1 is provided with a grill 11 for passage of loudspeaker sound to the outside. The front panel 12 of the case 1 is provided at its center with an ON-OFF button 13 of a control switch mechanism of double use for both recording and reproducing and at the left-hand side with a button 14 of a rewinding control mechanism. The buttons 13 and 14 are made clearly distinguishable from each other for correct identification even in the dark. In the example illustrated, button 13 is made much larger than button 14.

On the top surface of the aforementioned base plate 15, on the left and right sides thereof, and near the front wall 12, there are fixedly mounted two guide pedestals 16. The guide pedestals 16 at their inner top parts have cutout guide slots 17 in which the ends of slide plate 21 are slidably engaged, the slide plate 21 spanning the space between the guide pedestals 16 and supporting a recording-reproducing head 18, an erasing head 19, and a pinch roller 20 mounted thereon. The ends of the slide plate 21 are held in slidable engagement with their guide slots 17 by the free ends of leaf springs 21 fixed at their proximal ends to parts of the pedestals 16.

The bottom ends of the aforementioned winding and rewinding spindles 3 and 4 are respectively fixed to pulleys 23 and 24 rotatably supported on the base plate 15 at spaced apart right and left positions somewhat to the rear of the center of the base plate. To the rear of left pulley 24, a lever 25 is pivotally supported at an intermediate part thereof by a pivot pin 26 fixed to the base plate 15 and has a rightwardly extending arm on which a pulley 27 is rotatably supported.

The lever 25 further has a leftwardly extending arm, the left extremity of which is urged toward the front by a tension spring 28, and a recessed part 31 with which a projecting part 30 at the rear end of a horizontal rewinding control rod 29 is engaged. The rewinding control rod 29 is a push rod extending from rear to front and has a front extremity in abutting contact with a leftwardly extending arm of an L-shaped bell crank lever 33 pivoted about a vertical pivot pin 32 fixed to the base plate 15. The rear part of the aforementioned rewinding switch button 14 is in abutting contact with the right side of the other arm of the bell crank lever 33.

A pedestal pin 34 is fixed to the top side of the base plate 15 in a position to extend vertically toward the bottom side of the aforementioned slide plate 21. On the top end of this pin 34, there is pivotally supported an L-shaped bell crank lever 35 lying in a horizontal plane and having at the end of one of its arms a pin 36 fixed thereto and extending upward to engage slidably with a slot 37 in the slide plate 21. The other arm of the lever 35 has near its distal end a slot 38 which is engaged slidably with a vertical pin 39 fixed to a rearwardly projecting part of the aforementioned control switching button 13. A tension spring 40 is stretched between a pin 41 disposed directly to the rear of the pedestal pin 34 and a part 42 of the lever 35 near the slot 38 and is disposed above and slightly to the right of the pin 34 when the button 13 is in its right-hand OFF position.

A changeover switch 43 for switching the recording-reproducing circuits (not shown) is mounted on the base plate 15 in a position such that its switch actuation lever 44 projects toward the bottom surface of the slide plate 21, which is provided with a circular through hole 45 at the part thereof directly above the switch 43. The switch lever 44 has a double-throw action in a vertical front-to-rear plane and is biased toward the front by a tension spring 49.

A spool-like actuating member 48 having top and bottom flanges 47 and 46 is engaged slidably at its middle cylindrical part in the hole 45. When the tape recorder is orientated with the top side 1*a*, 1*b* facing upward, and the slide plate 21 is in the front position (corresponding to the OFF position of button 13), the actuating member 48 is in an operable lower position because of its weight and is held suspended in this state by the engagement of its flange 47 with the upper rim of the hole 45 as indicated by full lines in FIG. 9. The lower end (flange 46) of the actuating member 48 is then confronting the front side of the forwardly tilted switch 44 in very close proximity thereto.

Figure 10:
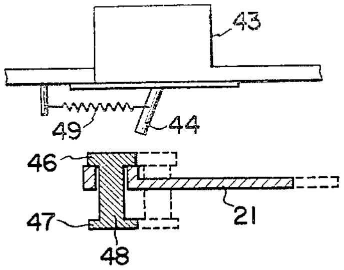
Figure 11:
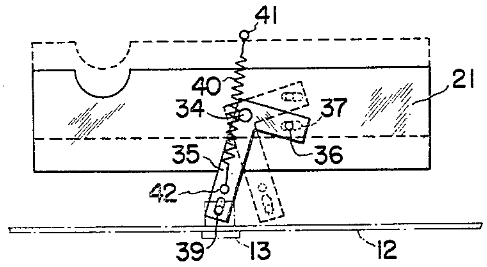
FIG. 11 is a fragmentary bottom plan view of a slide plate drive mechanism.

Then, when the tape recorder is turned over so that the grill 11 faces upward, the actuating member 48 descends under the force of gravity in the opposite direction (i.e., toward the tape side) and is held suspended by the engagement of its flange 46 with the bottom rim of the hole 45 as indicated in FIG. 10, the actuating member 48 thereby being in a position below and clear of the switch lever 44.

On the bottom side of the base plate 15, there are mounted a battery chamber 50, a loudspeaker 51, a tape drive motor 52, an amplifier 53, a circuit assembly 54, a flywheel 55 of the tape drive spindle 5, and other parts all compactly arranged to utilize the space in the bottom compartment.

A pulley 56 is fixed to the tape drive spindle 5 at a position on the top side of the base plate 15 and in the same horizontal plane as the aforementioned pulleys 23, 24, and 27. An endless drive belt 57 is passed around the pulleys 56, 23, and 27 and is normally separated from the pulley 24.

The example tape recorder of the above described organization according to the invention operates in the following manner.

For recording, the tape recorder structure 1 is positioned so that the top side 1*a*, 1*a* faces upward, and, after cover 7 has been opened, a tape cartridge 2 is placed in loaded position by causing its spindle receiving holes to fit onto winding spindle 3, rewinding spindle 4, and tape drive spindle 5. The control button 13 on front panel 12 is then pushed to the left into the ON position to start the recording operation.

More specifically, since the leftward movement of control button 13 causes lever 35 to rotate clockwise (as viewed in FIG. 5) about its pivot pin 34 counter to the force of spring 40, slide plate 21 is caused to move rearward, its ends sliding along their respective guide slots 17 until, finally, the ends contact stops 58 at the rear extremity of guide slots 17 and are thereby stopped. The slide plate 21 is thus held against stops 58 by the force of spring 40, which is now exerting a clockwise torque on lever 35 since lever 35 has passed a dead-center point with respect to spring 40.

Figure 9:
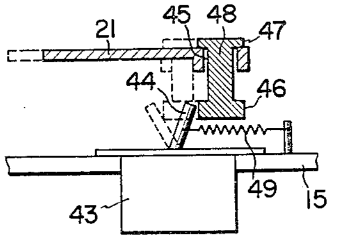
FIGS. 9 and 10 are fragmentary, relatively enlarged elevational views, partly in vertical section, for a description of an automatic mechanism for accomplishing switching of circuits for recording and reproducing in the tape recorder.
Figure 8:
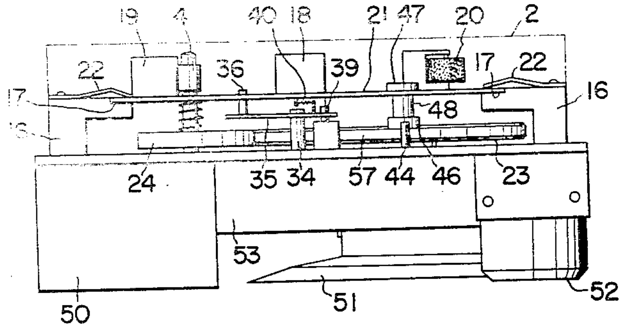
FIG. 8 is a front elevational view showing the internal parts as viewed from the front (lower side in FIG. 5)

During this rearward movement of slide plate 21, a part thereof trips a switch (not shown) to close the power supply circuit (also not shown) of the tape recorder. Furthermore, as indicated in FIG. 9 by intermittent line, actuating member 48 moves rearward together with slide plate 21 to engage and push switch lever 44 of switch 43 rearward, whereupon the recording circuit is turned on. At the same time, recording-reproducing head 18 and erasing head 19 are moved rearward against tape 9 within cartridge 2, and pinch roller 20 presses tape 9 against drive spindle 5. Accordingly, tape 9 accomplishes recording as it is taken up on winding spindle 3.

When the control button 13 is moved into the OFF position, the above described operation is reversed. That is, slide plate 21 slides toward the front, and pinch roller 20, recording-reproducing head 18, and erasing head 19 separate away from tape 9, the power supply circuit being opened to stop the recording operation. At the same time, switch lever 44 of switch 43, being released by actuating member 48, is returned to its original position by spring 49, whereupon the recording circuit is opened (i.e., turned off), and the reproducing circuit is closed (i.e., turned on).

Then, when rewinding button 14 is pushed toward the left (rewinding) position, it closes a switch (not shown) to close the power supply circuit and causes lever 33 to rotate clockwise (as viewed in FIG. 5) and push rewinding control rod 29 rearward counter to the force of spring 28. Consequently, lever 25 is rotated clockwise to press pulley 27 against pulley 24, which is thereby caused to rotate in the direction (clockwise as viewed in FIG. 5) opposite that of pulleys 27, 56, and 23. Thus, tape 9 is rewound on rewinding spindle 4. During this rewinding operation, rewinding button 14 is continually held by hand in the rewinding position against the force of spring 28. When rewinding button 14 is released, lever 25 and rewinding control rod 29 are returned to their original positions by the force of spring 28, whereupon the rewinding operation stops.

For reproducing the sound recorded in the above described manner, the top cover 7 is closed, and the tape recorder structure 1 is bodily turned over so that the bottom side or grill 11 is facing upward. Control button 13 is then pushed leftward into the ON position to start the reproducing operation.

More specifically, the leftward movement of control button 13 causes slide plate 21 to move rearward together with all parts mounted thereon, similarly as in the recording operation. This time, however, actuating member 48 has dropped away from switch lever 44 of switch 43, as indicated in FIG. 10, and moves rearward without engaging lever 44. Consequently, switch 43 is maintained in its state wherein the reproducing circuit is closed (i.e., turned on), and therefore reproducing is carried out. Then, when the control button 13 is pushed rightward to its OFF position, slide plate 21 and all parts mounted thereon are returned to their original positions, whereupon the reproducing operation stops.

As described in detail hereinabove, the present invention provides a tape recorder which is not maintained in the same orientation when carrying out recording and reproducing as in the case of conventional tape recorders but is always inverted or turned upside down in changing from one operation to the other, and this inverting movement causes automatic switching between the recording and reproducing circuits. Accordingly, there is no necessity for selection from a number of control switches for recording and then for reproducing as was heretofore necessary, the only necessary control actions being to turn the recorder upside down and to press a single button positioned on one of the outer faces of the recorder case.

Therefore, even children and other inexperienced persons can correctly operate the recorder, distinguishing positively between recording and reproducing operations, even in the dark. Furthermore, since the control mechanism is simple, there is relatively little possibility of malfunctioning. A further feature of the invention is that, since the loudspeaker is mounted to face the side opposite that of the tape and related mechanism, the entire tape recorder structure can be miniaturized to a true pocket size with the use of a relatively large loudspeaker, whereby a small tape recorder of high tone quality can be produced to sell at low price. I have found that this arrangement of the loudspeaker on the bottom side makes possible the reduction of the size of the tape recorder to a pocket size which is approximately one half of that of a conventional tape recorder of comparable performance.

While the invention is described above with respect to a specific example of preferred embodiment thereof, it will be apparent to those skilled in the art that various changes within the intended scope of the invention can be made in the details described above. For example, the control buttons for recording and reproducing and for rewinding can be positioned on the left and right faces or top and bottom faces of the tape recorder case. As another example, the slide plate 21 can be driven by electric motive means instead of by manual manipulation. Furthermore, instead of using tape in cartridges, tape wound on reels can be used.

What I claim is:

1. An ultraminiature tape recorder comprising:
 - an exterior case having on opposite sides thereof first and second panel sides;
 - tape operation means installed on said first panel side and operating to drive a recording tape in winding and rewinding operations;
 - a loudspeaker mounted to face outward from said second panel side;
 - recording and reproducing electrical circuits including a recording-reproducing head and said loudspeaker and operating in conjunction with said tape to accomplish recording and reproducing, respectively;
 - a changeover switch having two states respectively for changing over from one to the other the operations of said recording and reproducing circuits;
 - activating means operable by an ON-OFF button accessible from the exterior of said exterior case to switch on and off a power supply to said tape operation means and the recording and reproducing circuits;
 - gravity-operated means for causing said activating means to operate further to place said changeover switch in the state for operation of the recording circuit when the first panel side is facing upward and in the state for operation of the reproducing circuit when the second panel side is facing upward; and
 - rewinding control means operable by a button accessible from the exterior of the exterior case to cause the tape operation means to rewind the tape.

2. The ultraminiature tape recorder as claimed in claim 1 in which the first panel side is adapted to accommodate a cartridge loaded thereinto and containing a tape, and the tape operation means and recording-reproducing head are adapted to operate in conjunction with said tape.

3. The ultraminiature tape recorder as claimed in claim 1 in which the changeover switch is biased by a spring to be normally in one state of said two states, and the activating means includes a slide plate bearing the gravity-operated means and caused by the ON-OFF button to slide in an "ON" movement and an opposite "OFF" movement, the gravity-operated means operating during said "ON" movement to switch the changeover switch from said one state to the other of said two states when the first panel side is facing upward and to be clear of the changeover switch to permit it to remain in said one state when the second panel side is facing upward.

4. The ultraminiature tape recorder as claimed in claim 2 in which the changeover switch is biased by a spring to be normally in one state of said two states, and the activating means includes a slide plate bearing the gravity-operated means and caused by the ON-OFF button to slide in an "ON" movement and an opposite "OFF" movement, the gravity-operated means operating during said "ON" movement to switch the changeover switch from said one state to the other of said two states when the first panel side is facing upward and to be clear of the changeover switch to permit it to remain in said one state when the second panel side is facing upward.

References Cited

UNITED STATES PATENTS

| | | | |
|---|---|---|---|
| 3,019,300 | 1/1962 | Gormel | 179—100.1 |
| 3,104,289 | 9/1963 | Segel | 179—100.1 |
| 3,394,899 | 7/1968 | Schoenmakers | 242—55.13 |

BERNARD KONICK, Primary Examiner

J. P. MULLINS, Assistant Examiner

U.S. Cl. X.R.

179—100.1; 242—198; 274—4